(12) United States Patent
Ye et al.

(10) Patent No.: US 12,330,557 B2
(45) Date of Patent: Jun. 17, 2025

(54) SYSTEMS AND METHODS FOR AUTOMATED DRIVER ASSISTANCE

(71) Applicants: Juntao Ye, Markham (CA); Yu Zhao, Markham (CA)

(72) Inventors: Juntao Ye, Markham (CA); Yu Zhao, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/068,742

(22) Filed: Dec. 20, 2022

(65) Prior Publication Data
US 2024/0198904 A1 Jun. 20, 2024

(51) Int. Cl.
*B60Q 9/00* (2006.01)
*G07C 5/02* (2006.01)
*G08G 1/16* (2006.01)

(52) U.S. Cl.
CPC .............. *B60Q 9/00* (2013.01); *G07C 5/02* (2013.01); *G08G 1/16* (2013.01)

(58) Field of Classification Search
CPC ............... B60Q 9/00; G07C 5/02; G08G 1/16
See application file for complete search history.

(56) References Cited

U.S. PATENT DOCUMENTS

| | | | | |
|---|---|---|---|---|
| 2008/0042813 A1* | 2/2008 | Wheatley | ............... | B60Q 9/008 340/439 |
| 2017/0039890 A1* | 2/2017 | Truong | ................. | G09B 19/167 |
| 2019/0147272 A1* | 5/2019 | Yokota | ................... | G06V 40/18 340/576 |

FOREIGN PATENT DOCUMENTS

CN 113165665 A 7/2021

OTHER PUBLICATIONS

Mole, C., Pekkanen, J., Sheppard, W., Louw, T., Romano, R., Merat, N., Markkula, G., & Wilkie, R. (2020). Predicting takeover response to silent automated vehicle failures. PLOS ONE, 15(11), e0242825. https://doi.org/10.1371/journal.pone.0242825.
Fournier-Viger, P., Lin, J. C. W., Kiran, R. U., Koh, Y. S., & Thomas, R. (2017). A survey of sequential pattern mining. Data Science and Pattern Recognition, 1(1), 54-77.
Pinto, Helen, et al. "Multi-dimensional sequential pattern mining." Proceedings of the tenth international conference on Information and knowledge management. 2001.

(Continued)

*Primary Examiner* — Omer S Khan

(57) ABSTRACT

Systems and methods for alerting a driver to a potential driving hazard are disclosed. Hazard parameters representing a driving hazard may be received. The driving hazard may have a corresponding Ground Truth Operation Sequence (GTOS) comprising an ordered sequence of GTOS Designated Meta Operations (DMOs). The corresponding GTOS may be retrieved and instantiated using the hazard parameters. Current driver operation parameters may then be received, and may then be mapped to a GTOS DMO of the ordered sequence of GTOS DMOs. Subsequent driver operation parameters may then be received, and may then be compared to a set of probable subsequent operations associated with the mapped GTOS DMO. It may then be determined that the subsequent driver operation is absent from the set of probable subsequent operations, and an output may be generated for alerting a driver to the driving hazard.

20 Claims, 13 Drawing Sheets

600

| Operation | Parameter 1 | Parameter 2 | Parameter 3 |
|---|---|---|---|
| Looking | (x0, y0, x1, y1, t)<br>Bounding box of gaze point; t is the length of gaze in seconds | T<br>Ending time of gaze | L<br>Hazard level |

700

| Operation | Parameter 1 | Parameter 2 | Parameter 3 |
|---|---|---|---|
| Braking | a<br>Deceleration | v<br>Current speed | L<br>Hazard level |

(56) References Cited

OTHER PUBLICATIONS

Fournier-Viger, Philippe, Cheng-Wei Wu, and Vincent S. Tseng. "Mining maximal sequential patterns without candidate maintenance." International Conference on Advanced Data Mining and Applications. Springer, Berlin, Heidelberg, 2013.

Zaremba, Wojciech, Ilya Sutskever, and Oriol Vinyals. "Recurrent neural network regularization." arXiv preprint arXiv:1409.2329 (2014).

\* cited by examiner

| Operation | Parameter 1 | Parameter 2 | Parameter 3 |
|---|---|---|---|
| Braking | $a$ | $v$ | $L$ |
| | Deceleration | Current speed | Hazard level |

FIG. 7

| Operation | Parameter 1 | Parameter 2 | Parameter 3 |
|---|---|---|---|
| Steering | Θ | V | L |
|  | Angle | Current speed | Hazard level |

FIG. 8

| Operation | Parameter 1 | Parameter 2 | Parameter 3 |
|---|---|---|---|
| Acceleration | $a$ | $v$ | $L$ |
| | Acceleration Rate | Current speed | Hazard level |

FIG. 9

| Task | Index | DMO | Rules |
|---|---|---|---|
| Turning Right on a Red Light | E1 | 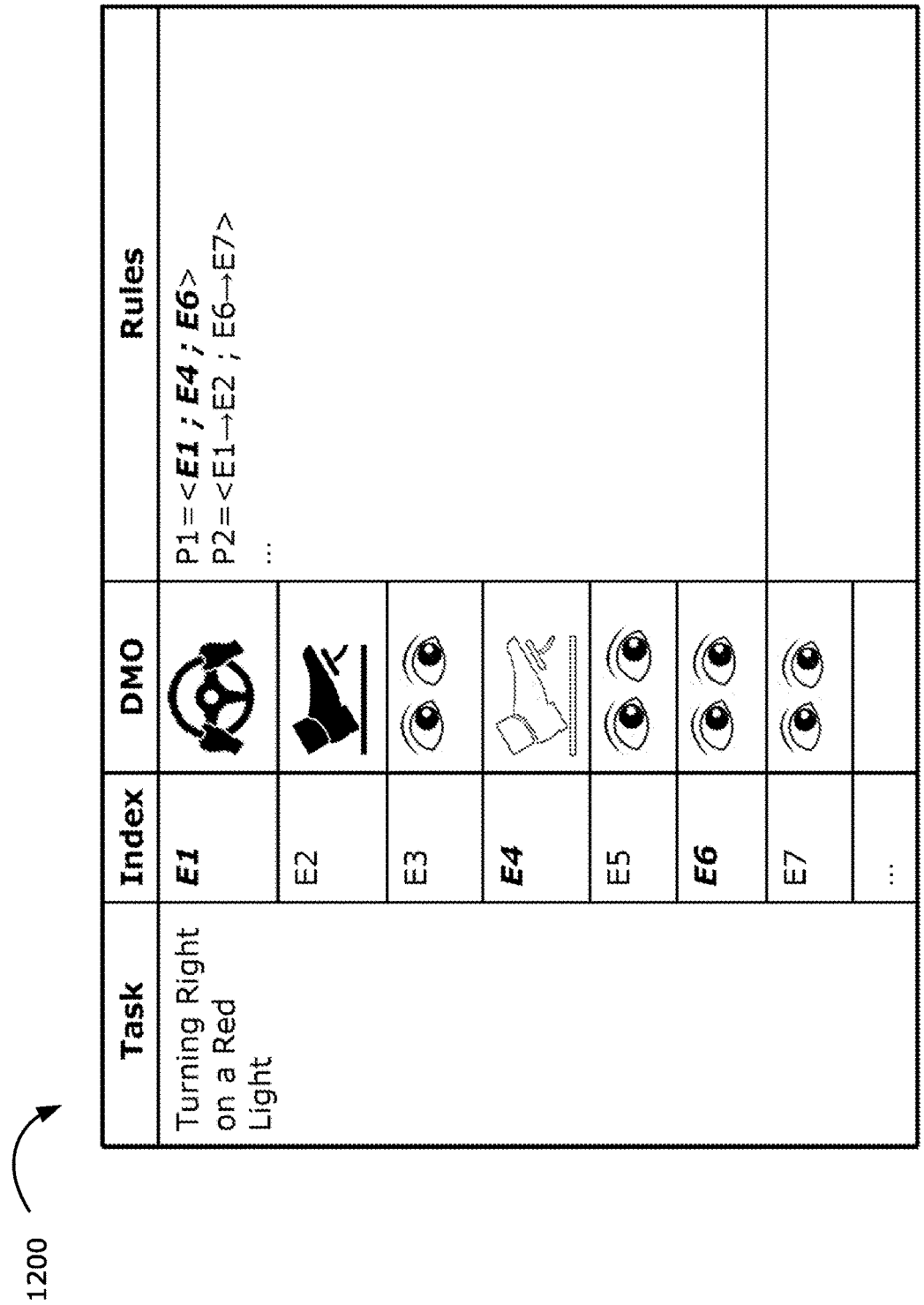 | P1=<*E1 ; E4 ; E6*><br>P2=<E1→E2 ; E6→E7><br>... |
| | E2 |  | |
| | E3 |  | |
| | E4 |  | |
| | E5 |  | |
| | E6 |  | |
| | E7 | 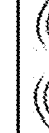 | |
| | ... | | |
FIG. 12

SYSTEMS AND METHODS FOR AUTOMATED DRIVER ASSISTANCE

FIELD

The present disclosure is related to systems and methods for providing driver assistance via a driver assistance system in a vehicle. In particular, the present disclosure is related to systems and methods for monitoring driver response to detected hazards and for alerting the driver when the response has been improper.

BACKGROUND

Human drivers often ignore surrounding driving hazards. For example, when drivers are overloaded with complex traffic or distractions (e.g., talking on a cell phone), they are prone to miss critical road information. Several parallel studies have drawn consistent conclusions that approaches are needed to compensate drivers' hazard perception bias and lack of defensive driving in such scenarios.

An example of a technology that aims to assist drivers in avoiding hazardous situations is the Driver Monitoring System (DMS). DMS, at present, is typically limited to two main features, drowsiness detection and distraction detection, neither of which are effective in enhancing hazard perception or improving defensive driving. To effect drowsiness detection, DMS typically detects critical driver behaviors such as eye closure, blink rate, yawning, nodding and posture. The effectiveness of this feature is limited, however, as staying alert does not guarantee good hazard perception, especially for inexperienced drivers. To effect distraction detection, DMS typically relies on measurements of visual attention, such as the percentage of on-/off-road glance, and only considers static areas of interest (AOIs), which generally are not related to the dynamic environment or to different driving tasks.

Another example of a technology that is related to hazard perception and defensive driving are advanced driver-assistance systems (ADAS). Conventionally, ADAS uses automated technology, such as sensors and cameras, to detect potential hazards and to provide assistance in performing various driving functions (e.g., cruise control, anti-lock brakes, forward collision warning (FCW), high beam safety system, lane departure warning, traffic signals recognition, traction control, automatic emergency braking (AEB), etc.). However, ADAS generally does not provide fully autonomous driving as the human driver is still required to determine and execute an appropriate action once a hazard has been identified. For example, FCW may alert the driver of a potential hazard, and AEB may be used to avoid the hazard, but the driver must still take the action of braking.

SUMMARY

In some embodiments, the present disclosure is directed to systems and methods for automatically monitoring a driver's ability to perceive hazards, and for subsequently providing targeted feedback, in much the same way as a human driving instructor might do. For example, a driving instructor usually monitors every moment of a student driver's driving. When the instructor perceives hazards on the road, he or she may check the driver's gaze to see if the driver also notices the hazards. An instructor may also sense the driver's hand and foot operations from the motion of the vehicle. Based on the driver's observation-operation (ob-op), an instructor may be able to deduce the student driver's intention. The instructor may remind the student driver only if his or her deduced intention seems unreasonable. Embodiments of the present disclosure may operate as a virtual driving instructor system to assist a human driver in the completion of safe driving in a hazardous situation.

According to one aspect of the present disclosure, there is provided a system. The system comprises one or more processors, a memory coupled to the one or more processors, the memory storing executable instructions which, when executed by the one or more processors, cause the system to: receive, from a driver assistance system, current driver operations parameters; map the current driver operation parameters to a GTOS DMO of an ordered sequence of GTOS DMOs; receive, from the driver assistance system, subsequence driver operation parameters representing a subsequent driver operation; compare the subsequent driver operations parameters to a set of probable subsequent operations associated with the mapped GTOS; determine that the subsequent driver operation is absent from the set of probable subsequent operations; and generate an output for alerting a driver to the potential driving hazard.

Optionally, before the step of map the current driver operation parameters to a GTOS DMO of the ordered sequence of GTOS DMOs, the system is further caused to: receive, from an exterior environment sensing system, hazard parameters representing a potential driving hazard, the potential driving hazard having a corresponding Ground Truth operation Sequence (GTOS) comprising an ordered sequence of GTOS designated meta operations (DMOs); retrieve the corresponding GTOS; and instantiate the corresponding GTOS using the hazard parameters.

In some implementations, the GTOS is defined by a task data structure, the task data structure comprising GTOS DMOs and a set of rules, the set of rules defining orders of operations among the GTOS DMOs.

In some implementations, each GTOS DMO and each current driver operation DMO includes an operation and one or more operational parameters.

In some implementations, to determine the corresponding GTOS, prior to receiving, from the exterior environment sensing system, the hazard parameters representing the potential driving hazard, the potential driving hazard having a corresponding GTOS, the system is further caused to: receive a plurality of sets of sequential operational parameters representing experienced driver behavior associated with the potential driving hazard; construct a sequence of DMOs for each set of the plurality of sets of sequential operational parameters; construct a database of constructed operation sequences based on the constructed sequences of DMOs, wherein each of the constructed operation sequences corresponds to at least one of the constructed sequences of DMOs; extract a maximal sequential pattern from the database of constructed operation sequences using sequential pattern mining; and determine the GTOS to be the maximal sequential pattern.

In some implementations, the plurality of sets of sequential operational parameters are received from the driver assistance system during operation of the vehicle by experienced drivers.

In some implementations, the set of DMOs includes multimodality DMOs, and the system is further caused to: prior to extracting the maximal sequential pattern from the database of constructed operation sequences, linearize each multimodality DMO.

In some implementations, the set of probable subsequent operations associated with the mapped GTOS DMO is determined using sequential rule mining on the constructed operation sequences to determine a likely operation following a previous operation.

In some implementations, the current driver operation parameters and the subsequent driver operation parameters include one or more gaze parameters, steering parameters, braking parameters and acceleration parameters.

In some implementations, the gaze parameters are received from one or more gaze tracking systems, and the steering parameters, the braking parameters and the acceleration parameters are received from one or more Electronic Control Units (ECUs).

In some implementations, the system is further caused to, subsequent to receiving the current driver operation parameters: determine an eye gaze vector; compute an intersection of the eye gaze vector with an ADAS display; detect driver gaze points; and detect driver gaze trajectory.

In some implementations, the output for alerting the driver to the potential driving hazard includes one or more of an augmented reality head-up display (AR-HUD) warning symbol and a voice user interface (VUI) audio alert.

According to another aspect of the present disclosure, there is provided a method for alerting a driver to a potential driving hazard. The method comprises: receiving, from a driver assistance system, current driver operations parameters; mapping the current driver operation parameters to a GTOS DMO of an ordered sequence of GTOS DMOs; receiving, from the driver assistance system, subsequence driver operation parameters representing a subsequent driver operation; comparing the subsequent driver operations parameters to a set of probable subsequent operations associated with the mapped GTOS; determining that the subsequent driver operation is absent from the set of probable subsequent operations; and generating an output for alerting a driver to the potential driving hazard.

Optionally, before mapping the current driver operation parameters to a GTOS DMO of an ordered sequence of GTOS DMOs, further comprising: receiving, from an exterior environment sensing system, hazard parameters representing a potential driving hazard, the potential driving hazard having a corresponding Ground Truth operation Sequence (GTOS) comprising an ordered sequence of GTOS designated meta operations (DMOs); retrieving the corresponding GTOS; instantiating the corresponding GTOS using the hazard parameters.

In some implementations, the GTOS is defined by a task data structure, the task data structure comprising GTOS DMOs and a set of rules, the set of rules defining orders of operations among the GTOS DMOS.

In some implementations, each GTOS DMO and each current driver operation DMO includes an operation and one or more operational parameters.

In some implementations, prior to receiving, from the exterior environment sensing system, the hazard parameters representing the potential driving hazard, the potential driving hazard having a corresponding GTOS, the method further comprises: receiving a plurality of sets of sequential operational parameters representing experienced driver behavior associated with the potential driving hazard; constructing a sequence of DMOs for each set of the plurality of sets of sequential operational parameters; constructing a database of constructed operation sequences based on the constructed sequences of DMOs, each of the constructed operation sequences corresponding to at least one of the constructed sequences of DMOs; extracting a maximal sequential pattern from the database of constructed operation sequences using sequential pattern mining; and determining the GTOS to be the maximal sequential pattern.

In some implementations, the plurality of sets of sequential operational parameters are received from the driver assistance system during operation of the vehicle by experienced drivers.

In some implementations, the set of DMOs includes multimodality DMOs, and the method further comprises: prior to extracting the maximal sequential pattern from the database of constructed operation sequences, linearizing each multimodality DMO.

In some implementations, the set of probable subsequent operations associated with the mapped GTOS DMO is determined using sequential rule mining on the constructed operation sequences to determine a likely operation following a previous operation.

In some implementations, the current driver operation parameters and the subsequent driver operation parameters include one or more gaze parameters, steering parameters, braking parameters and acceleration parameters.

In some implementations, the gaze parameters are received from one or more gaze tracking systems, and the steering parameters, the braking parameters and the acceleration parameters are received from one or more Electronic Control Units (ECUs).

In some implementations, the method further comprises, subsequent to receiving the current driver operation parameters: determining an eye gaze vector; computing an intersection of the eye gaze vector with an ADAS display; detecting driver gaze points; and detecting driver gaze trajectory.

In some implementations, the output for alerting the driver to the potential driving hazard includes one or more of an augmented reality head-up display (AR-HUD) warning symbol and a voice user interface (VUI) audio alert.

According to yet another aspect of the present disclosure, there is provided a non-transitory computer readable medium containing instructions which, which executed by one or more processors, cause the one or more processors to: receive, from a driver assistance system, current driver operations parameters; map the current driver operation parameters to a GTOS DMO of the ordered sequence of GTOS DMOs; receive, from the driver assistance system, subsequence driver operation parameters representing a subsequent driver operation; compare the subsequent driver operations parameters to a set of probable subsequent operations associated with the mapped GTOS; determine that the subsequent driver operation is absent from the set of probable subsequent operations; and generate an output for alerting a driver to the potential driving hazard.

Optionally, before map the current driver operation parameters to a GTOS DMO of the ordered sequence of GTOS DMOs, further cause the one or more processors to: receive, from an exterior environment sensing system, hazard parameters representing a potential driving hazard, the potential driving hazard having a corresponding Ground Truth operation Sequence (GTOS) comprising an ordered sequence of GTOS designated meta operations (DMOs); retrieve the corresponding GTOS; instantiate the corresponding GTOS using the hazard parameters.

BRIEF DESCRIPTION OF THE DRAWINGS

Reference will now be made, by way of example, to the accompanying drawings which show example embodiments of the present disclosure, and in which:

FIG. 7 is a table illustrating a second example designated meta-operation (DMO), in accordance with examples of the present disclosure;

FIG. 8 is a table illustrating a third example designated meta-operation (DMO), in accordance with examples of the present disclosure;

FIG. 9 is a table illustrating a fourth example designated meta-operation (DMO), in accordance with examples of the present disclosure;

FIG. 12 is a table illustrating the data structure of an example task, in accordance with examples of the present disclosure.

Similar reference numerals may have been used in different figures to denote similar components.

DETAILED DESCRIPTION

Some examples of the present disclosure are described in the context of vehicles having advanced driver assistance systems (ADAS). Although examples described herein may refer to a car as the vehicle, the teachings of the present disclosure may be implemented in other forms of vehicles that may be equipped with ADAS including, for example, trams, subways, trucks, buses, surface and submersible watercraft and ships, aircraft, warehouse equipment, construction equipment, farm equipment, and other such vehicles.

Figure 1:
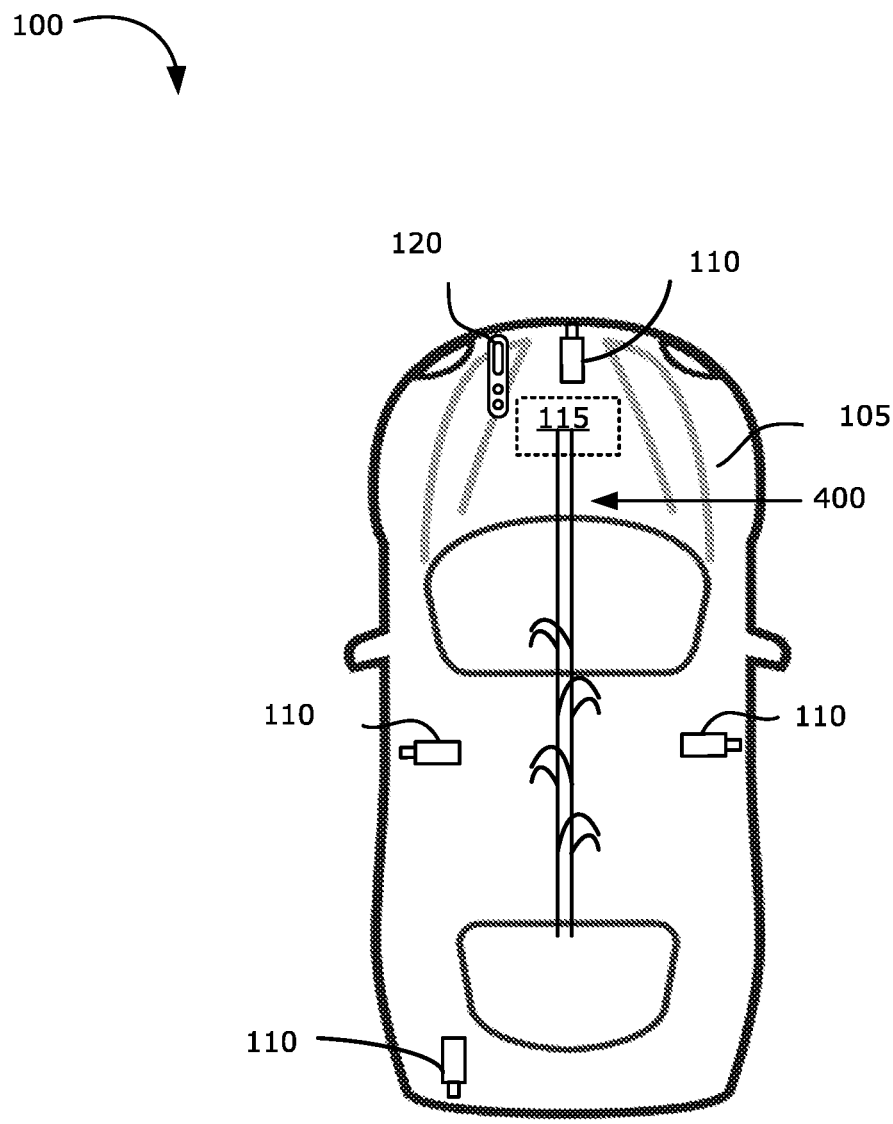
FIG. 1 is a schematic diagram showing an example environment and vehicle, in which examples of the present disclosure may be implemented, in accordance with examples of the present disclosure.

FIG. 1 is a schematic diagram showing an example environment 100 in which a vehicle 105 operates. Examples of the present disclosure may be implemented in the vehicle 105. The vehicle 105 includes a vehicle control system 115. The vehicle control system 115 may include an ADAS, as described further below with reference to FIG. 2.

The vehicle 105 may include sensors, including exterior environment sensors 110 and gaze trackers 120. Additional sensors may form part of the vehicle controller area network bus (CAN-bus) network 400. The exterior environment sensors 110 are shown here as a plurality of exterior environment sensors 110 that collect information about the exterior environment 100 surrounding the vehicle 105 and generate sensor data indicative of such information. There may be different types of exterior environment sensors 110 to collect different types of information about the exterior environment 100, as discussed further below. In an example embodiment, the exterior environment sensors 110 are mounted to and located at the front, rear, left side and right side of the vehicle 105 to collect information about the exterior environment 100 located in front, rear, left side and right side of the vehicle 105. Individual units of the exterior environment sensors 110 may be mounted or otherwise located on the vehicle 105 to have different overlapping or non-overlapping fields of view (FOVs) or coverage areas to capture data about the exterior environment 100 surrounding the vehicle 105. The vehicle control system 115 receives sensor data indicative of collected information about the exterior environment 100 of the vehicle 105 as collected by the exterior environment sensors 110. In some embodiments, the vehicle control system 115 may receive sensor data and/or parameters from the exterior environment sensors 110 via the ADAS.

In some embodiments, the gaze trackers 120 may comprise a gaze tracking system. The gaze trackers 120 may include high-fidelity gaze tracking technology and may be mounted to the interior of the vehicle, or may be provided as a wearable device to be worn by the driver.

In some embodiments, the gaze tracking system and the CAN-bus network 400 may comprise a driver assistance system. In some embodiments, the vehicle control system 115 may receive parameters representing one or more driver operations via the driver assistance system.

The vehicle 105 also comprises various structural elements such as a frame, doors, panels, seats, windows, mirrors and the like that are known in the art but that have been omitted from the present disclosure to avoid obscuring the teachings of the present disclosure.

Figure 2:
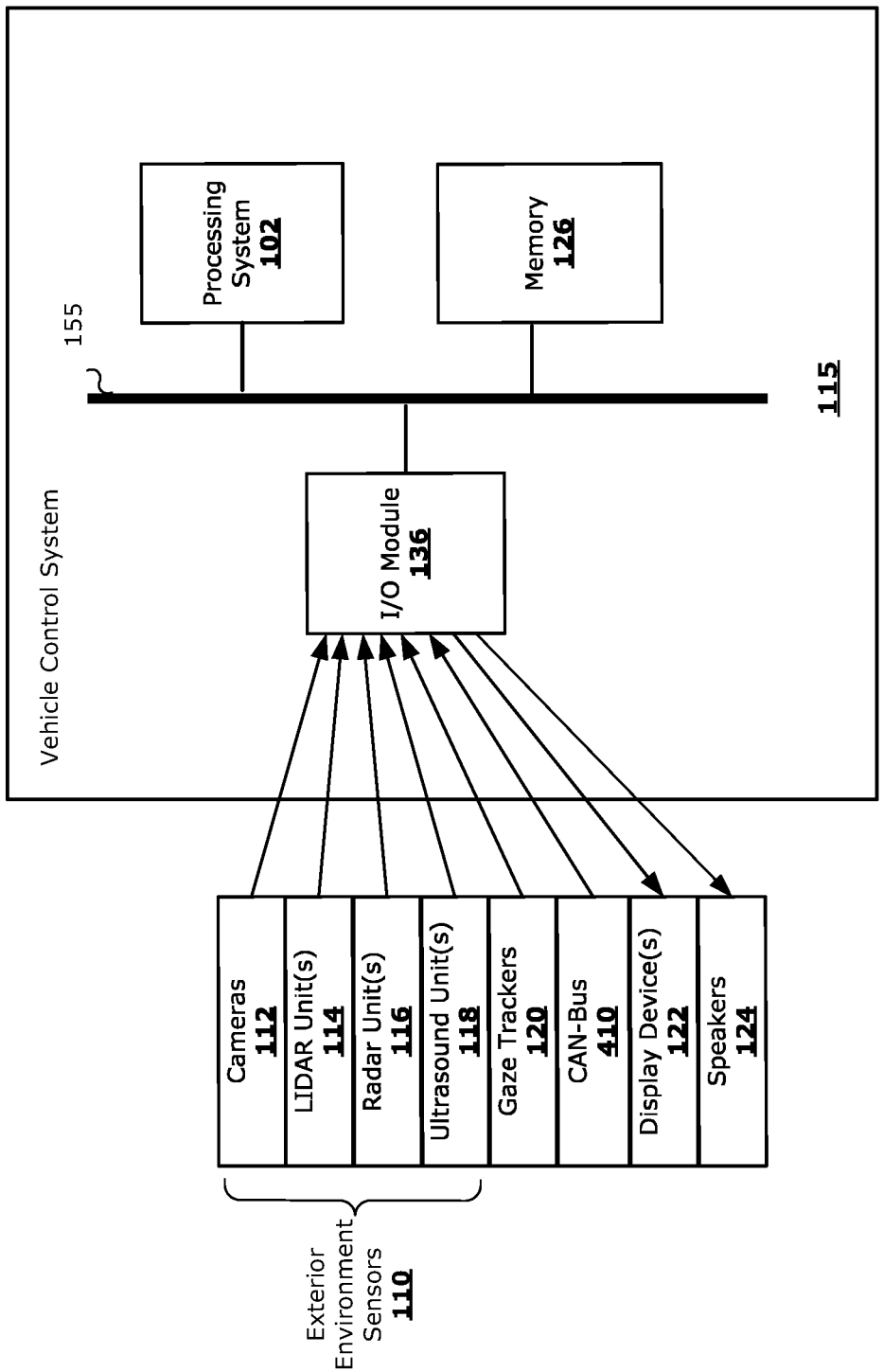
FIG. 2 is a high-level operation diagram of an example vehicle control system, including a schematic illustration of various example input devices and output devices that may be in communication with the vehicle control system, in accordance with examples of the present disclosure.

FIG. 2 is a high-level operation diagram of an example vehicle control system 115, including a schematic illustration of various example input devices and output devices that may be in communication with the vehicle control system 115. The example vehicle control system 115 includes a variety of modules. For example, as illustrated, the vehicle control system 115 may include a processing system 102, a memory 126, and an input-output (I/O) module 136. As illustrated, the foregoing example modules of the vehicle control system 115 are in communication over a bus 155.

The processing system 102 may include one or more processing units, including for example one or more central processing units (CPUs), one or more graphical processing units (GPUs), one or more tensor processing units (TPUs), and other processing units.

The I/O module 136 is an input module and an output module. As an input module, the I/O module 136 allows the vehicle control system 115 to receive input from components of the vehicle control system 115. In some embodiments, the I/O module 136 may allow the vehicle control system 115 to provide output to one or more output device and/or receive input from one or more input devices.

As shown in FIG. 2, the I/O module 136 may be used in providing output to one or more output devices, such as, for example, via one or more display devices 122 and/or via one or more speakers 124. As also shown in FIG. 2, the I/O module 136 may receive input from one or more input devices, such as, for example, via exterior environment sensors 110, gaze trackers 120, and a vehicle (CAN-bus 410. (The CAN-bus will be discussed in more detail with respect to FIG. 4.) As shown, exterior environment sensors 110 may, for example, include one or more cameras 112, one or more light detection and ranging (LIDAR) units 114, one or more radar units 116, and one or more ultrasound units 118, among other possibilities. Each type of sensor may collect respective different information about the exterior environment 100 (FIG. 1), and may provide sensor data to the vehicle control system 115 in respective formats. For example, a camera 112 may provide camera data representative of a digital image, a LIDAR unit 114 may provide a two or three-dimensional point cloud, a radar unit 116 may provide radar data representative of a radar image, and an ultrasound unit 118 may provide ultrasonic data.

In some examples, the display devices 122 may include a head-up display (HUD) unit, capable of providing an augmented reality (AR) display (i.e., a display of one or more virtual objects together with a live view of a real-world environment). For example, a HUD unit may enable one or more virtual objects to be displayed in a front windshield (or other front-facing display/window/viewport) of the vehicle 105 (FIG. 1), such that the one or more virtual objects are overlaid on a real-world view of the exterior environment 100 (FIG. 1). The HUD unit may provide a display over only a portion of the windshield or may provide a display that spans all or most of the windshield. The HUD unit may use any suitable hardware to generate the display. In another example, a display device 122 may be integrated with the vehicle 105 (FIG. 1), such as a dashboard-mounted display that enables virtual object(s) to be displayed overlaid on a live camera view of the exterior environment 100 (FIG. 1). In another example, a display device 122 may not be integrated with the vehicle 105, such as a wearable device (e.g., a head mounted display (HMD), or smartglasses) that enables virtual object(s) to be displayed overlaid on a live camera view or real-world view of the exterior environment 100 (FIG. 1), and that updates the AR display to track the movement of the wearer's head. Other embodiments of a display device 122 may be possible within the scope of the present disclosure.

In some implementations, the AR-HUD unit and the ADAS display may be combined into a single display device.

The memory 126 of the vehicle control system 115 allows data to be stored and retrieved. The memory may include, for example, random access memory (RAM), read-only memory (ROM), and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the vehicle control system 115.

The memory 126 may be used to store and retrieve data in one or more databases. One or more databases may be stored in persistent storage in the memory 126. The one or more databases may include, for example, a database of driving tasks.

Instructions stored on the computer readable storage medium may be software instructions that are executable by one or more processing units of the processing system 102. For example, software may be loaded into random-access memory from persistent storage of memory 126. Additionally or alternatively, instructions may be executed by one or more processors of the processing system 102 directly from read-only memory of the memory 126. The software instructions may be executed by the processing system 102 to implement one or more software systems, software subsystems, and software modules. Generally, it should be understood that software systems, software subsystems, and software modules disclosed herein may be implemented as a set of computer-readable instructions stored in the memory 126. For example, the memory 126 may include executable instructions for implementing an operating system, an AR renderer, an ADAS, a voice user interface (VUI), and a driver assistance application. The memory 126 may also have stored thereon instructions for implementing other software systems, subsystems, and modules, for example a navigation module, a climate control module, a media player module, a telephone module and/or a messaging module.

Figure 3:
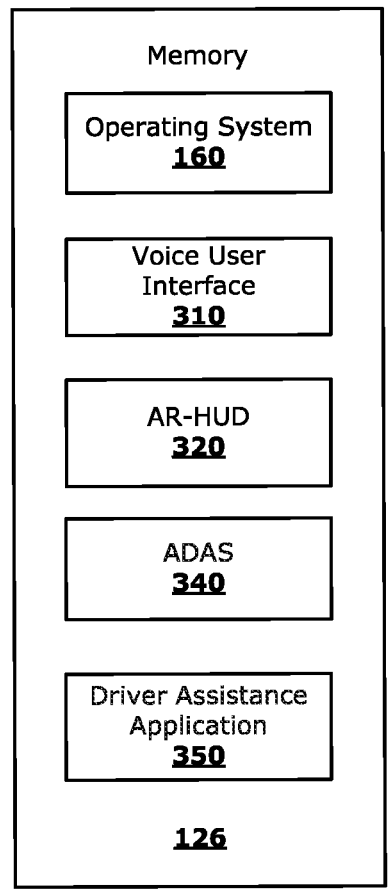
FIG. 3 depicts a simplified organization of software components stored in memory of the vehicle control system, in accordance with examples of the present disclosure.

FIG. 3 depicts a simplified organization of software components that may be stored in the memory 126 of the vehicle control system 115 (FIG. 1). As illustrated, the components may include, for example, an operating system 160, and application software such as a VUI 310, an augmented reality heads-up display (AR-HUD) renderer 320, an ADAS 340, and a driver assistance application 350.

The operating system 160 is software. The operating system 160 allows the application software, such as the VUI 310, the AR-HUD renderer 320, the ADAS 340, and the driver assistance application 350, to access the processing system 102 (FIG. 2), the memory 126, and the I/O module 136 (FIG. 2). The application software adapts the vehicle control system 115 (FIG. 1), in combination with the operating system, to operate as a device performing particular functions.

Sensor data received from the exterior environment sensors 110 (FIG. 1) may be used by the ADAS 340 to perform perception functions, including interpreting sensor data to reconstruct certain features of interest about the exterior environment 100 (FIG. 1) and to determine a state of the vehicle 105 (FIG. 1). The ADAS 340 may operate as an exterior environment sensing system, in that it may extract data from the exterior environment sensors 110 (FIG. 1), including, for example, cameras, LIDAR, radar and ultrasound.

It will be understood that the ADAS 340 may be any ADAS that is typically found in state-of-the-art cars. An example ADAS 340 is now described. The ADAS 340 may perform sensor fusion, which combines information extracted from different sensor data. Sensor data that is inputted to the ADAS 340 may include data from one or more exterior environment sensors 110 (FIG. 1), such as a camera unit, a LIDAR, a radar unit and an ultrasound unit. A camera unit may generate color image data that may be used for road detection and on-road object detection. A radar unit may generate radar data that may be used for short and long range distance estimation to objects in the exterior environment 100 (FIG. 1). A LIDAR unit may generate point cloud data containing sparse 3D points representing reflected light from objects in the exterior environment 100 (FIG. 1). An ultrasound unit may generate ultrasound data that may be used for close range distance measurement, such as in parking scenarios. Sensor fusion enables data from such different exterior environment sensors 110 (FIG. 1) to be combined in an intelligent way, to provide a richer and more complete understanding of the exterior environment 100 (FIG. 1). Various techniques may be used by the ADAS 340 to perform sensor fusion, such as feature-level fusion (e.g., associating features extracted from color image data with a 3D point in a point cloud) and/or decision-level fusion (e.g., using two separate classifiers trained on camera data and LIDAR data respectively).

The ADAS 340 may operate as an exterior environment sensing system, extracting sensor data from one or more exterior environment sensors 110 (FIG. 1), and may process this data to provide parameters based on the extracted data to other applications, such as the AR-HUD renderer 320 and/or the driver assistance application 350.

The ADAS 340 may output a current state of the vehicle 105 (FIG. 1), which includes data representing the current operation of the vehicle 105 (FIG. 1). The current state of the vehicle 105 (FIG. 1) may also include estimated or predicted data, such as the predicted trajectory of the vehicle 105 (FIG. 1).

Generally, the ADAS 340 may output a 3D map (or other data structure) representing the exterior environment 100 (FIG. 1) and the state of the vehicle 105 (FIG. 1) within the exterior environment 100 (FIG. 1). The 3D map may be generated using an ADAS coordinate system. The 3D map, or other data structure, may be output to an I/O device such as an ADAS display. In some implementations, the AR-HUD unit and the ADAS display may be combined within a single display device. The output from the ADAS 340 may provide to the driver assistance application 350.

The AR-HUD renderer 320 takes input information, such as information about the 3D exterior environment 100 (e.g., generated by the ADAS 340), a 3D model of the vehicle 105 (e.g., defined or pre-programmed by the manufacturer of the vehicle 105), and generates an output for display on the vehicle dashboard and/or windshield.

The VUI 310 provides for spoken interaction between a vehicle occupants and the vehicle control system 115 (FIG. 1). The VUI 310 may receive input from the ADAS 340 and/or the driver assistance application 350. The VUI 310 may be used to alert a driver to a potential driving hazard via speakers 124 (FIG. 2), for example.

The driver assistance application 350 may receive input from the ADAS 340, including parameters representing a driving hazard. The ADAS 340, acting as an exterior environment sensing system, may provide these parameters to the driver assistance application 350. The driver assistance application 350 may receive input from a vehicle CAN-bus and/or a vehicle on-board diagnostics-II (OBD-II), which may be used by the driver assistance application 350 to determine steering parameters, braking parameters, and acceleration parameters of the vehicle 105 (FIG. 1). The driver assistance application 350 may receive input from a gaze tracking system, including gaze trackers 120 (FIG. 1), and may use gaze tracker input to determine driver eye positions and to calibrate the gaze tracker eye coordinate system with the ADAS coordinate system. The driver assistance application 350 may provide output to the AR-HUD and/or to the VUI 310. The driver assistance application 350 may communicate with the ADAS 340 via one or more application programming interfaces (APIs).

Figure 4:
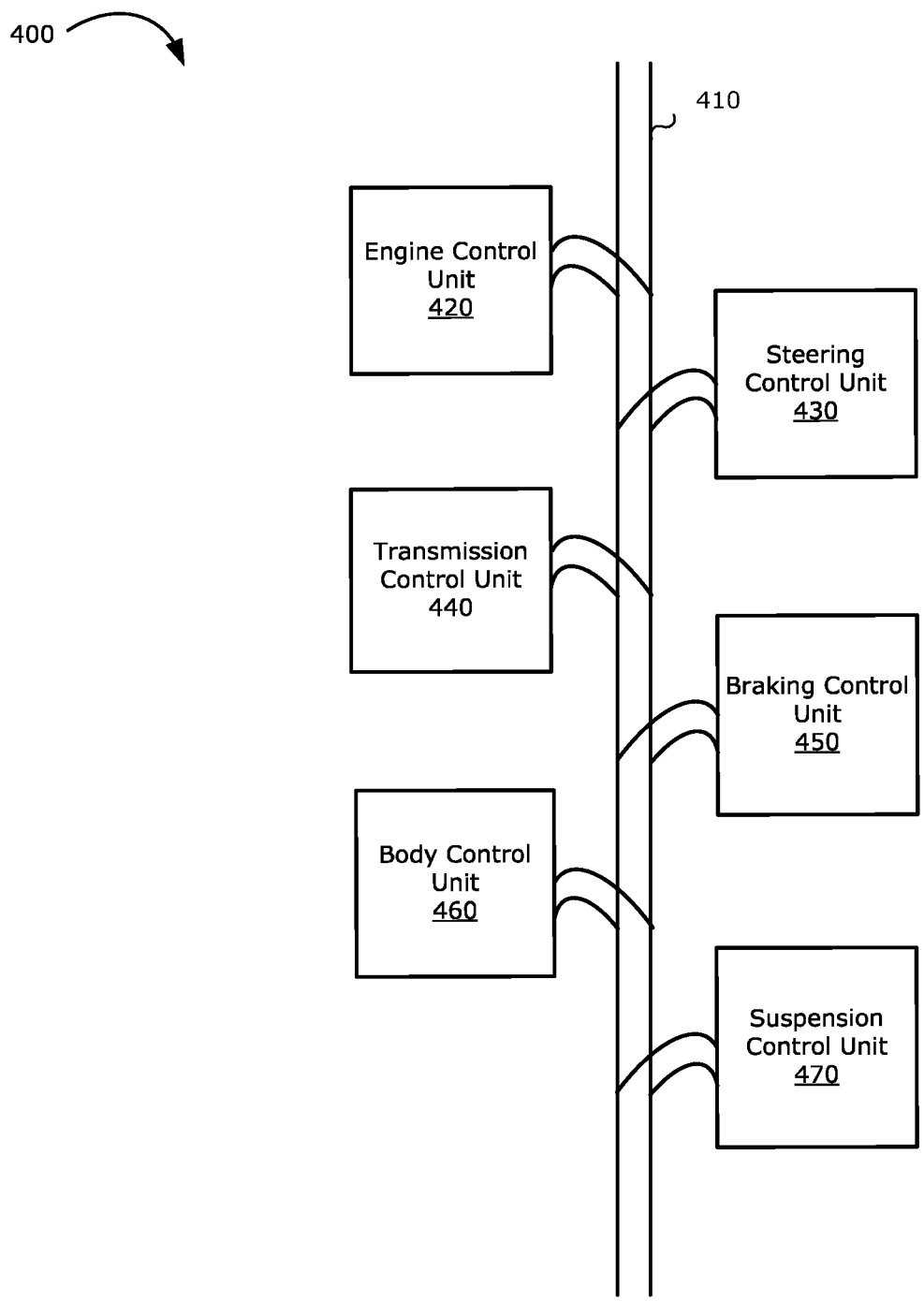
FIG. 4 is a high-level operation diagram of an example vehicle controller area network bus (CAN-bus) network, in accordance with examples of the present disclosure.

FIG. 4 is a high-level operation diagram of an example vehicle controller area network bus (CAN-bus) network 400. It will be understood that a CAN bus is a robust vehicle bus standard designed to allow microcontrollers and devices to communicate with each other's applications without a host computer.

The example vehicle CAN-bus network 400 includes a variety of electronic control units (ECUs) in communication over a CAN-bus 410. It will be understood that an ECU is an embedded system in automotive electronics that controls one or more of the electrical systems or subsystems in a car or other motor vehicle. For example, as illustrated, the example vehicle CAN-bus network 400 may include an engine control unit 420, a steering control unit 430, a transmission control unit 440, a braking control unit 450, a body control unit 460 and a suspension control unit 470. In some embodiments, driver hand and foot operation may be derived, for example, by the driver assistance application 350 (FIG. 3), from the CAN-bus network data, or from other vehicle bus data.

The engine control unit 420 controls a series of actuators on an internal combustion engine to ensure optimal engine performance. The engine control unit 420 may read values from a multitude of sensors within the engine bay, interpreting the data using multidimensional performance maps (also known as lookup tables), and adjusting the engine actuators. The engine control unit 420 may also control vehicle fuel lines. In some embodiments, acceleration parameters may be derived in part (e.g., by the driver assistance application 350 (FIG. 3)), from engine control unit data.

The steering control unit 430 can sense the position of the steering wheel, note which direction the steering wheel is turning, and how fast the steering wheel is being turned. The steering control unit 430 can sense the speed of the vehicle, the angle of the headlights, and many other factors relating to driver control of the vehicle. The steering control unit 430 can determine how much force to apply to the steering gear and at what ratio to turn the wheels, for example. The transmission control unit 440 can control electronic automatic transmissions. The transmission control unit 440 can calculate how and when to change gears in the vehicle for optimum performance, fuel economy and shift quality. In some embodiments, steering parameters may be derived, for example, by the driver assistance application 350 (FIG. 3), from steering control unit data.

The braking control unit 450 can receive the brake force required for the vehicle's wheels and can receive wheel speed signals. The braking control unit 450 can also provide signals to drive the action of the vehicle's brakes. In some embodiments, braking parameters may be derived in part, for example, by the driver assistance application 350 (FIG. 3), from braking control unit data.

The body control unit 460 can control various electronic accessories in a vehicle, such power windows, power mirrors, air conditioning, the immobilizer system, central locking, etc.

The suspension control unit 470 can control the air suspension of a vehicle while managing passenger comfort and vehicle dynamics. The suspension control unit 470 can enable a vehicle to handle different terrain and road conditions.

Figure 5:
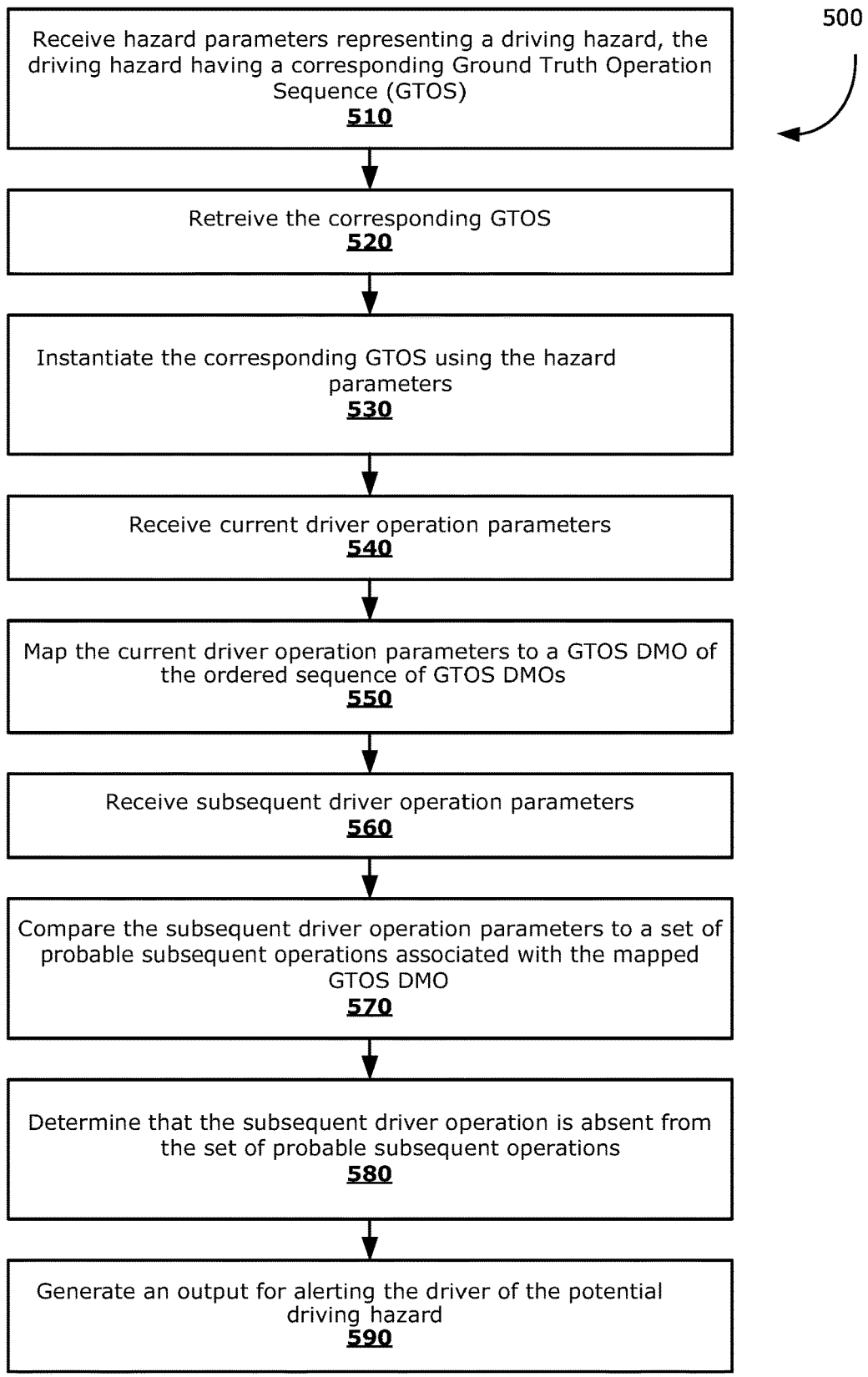
FIG. 5 is a flowchart showing operations performed by the vehicle control system to generate an output for alerting a driver to a potential driving hazard, in accordance with examples of the present disclosure.

FIG. 5 is a flowchart showing example operations performed by the vehicle control system 115 (FIG. 1) to generate an output for alerting a driver to a potential driving hazard, according to embodiments. The operations may be included in a method 500, which may be performed by the vehicle control system 115 (FIG. 1). For example, processor-executable instructions stored in memory of the vehicle control system 115 (FIG. 1) may, when executed by one or more processors, configure the system to perform the method 500 or part thereof.

At the operation 510, the vehicle control system 115 (FIG. 1) receives hazard parameters representing a potential driving hazard, the potential driving hazard having a corresponding ground truth operation sequence (GTOS) comprising an ordered sequence of GTOS designated meta operations (DMOs). The potential driving hazard may be, for example, an intersection, a red light, a right-turn arrow, a pedestrian, etc. The hazard parameters may be received from an exterior environment sensing system, which may, for example, be, include, or form part of, the ADAS 340 (FIG. 3). The exterior environment sensing system may extract data from the exterior environment sensors 110 (FIG. 1), including, for example, cameras, LIDAR, radar and ultrasound, and may process this data to produce parameters which are then received by the vehicle control system 115 (FIG. 1), for example, by the driver assistance application 350 (FIG. 3) of the vehicle control system 115 (FIG. 1). For example, a potential driving hazard, such as a red light, may be detected by an exterior environment sensing system via one or more of the exterior environment sensors 110 (FIG. 1). The driver assistance application 350 (FIG. 3) of the vehicle control system 115 (FIG. 1) may then receive parameters representing this hazard from the ADAS 340 (FIG. 3).

Each potential driving hazard may have a corresponding Ground Truth Operation Sequence (GTOS). The corresponding GTOS may represent an expected, basic, minimum sequence of operations required for a successful response to the potential driving hazard. For example, the potential driving hazard of a red light may have a corresponding GTOS representing an expected, basic, minimum sequence of driver operations required for responding to the red light.

Embodiments described herein compare real-time driver operation to expected driver operation, and may generate an output to alert the driver when the real-time driver operation does not match the expected driver operation. A plurality of GTOSes, each corresponding to one or more potential driving hazards, may be stored in a database of driving tasks, which may be stored in the memory 126 (FIG. 2).

At the operation 520, the vehicle control system 115 (FIG. 1) retrieves the corresponding GTOS. As noted, the GTOS may be stored in the database of driving tasks, which may be stored in the memory 126 (FIG. 2). The corresponding GTOS may comprise an ordered sequence of GTOS DMOs. A DMO may have a data structure including one or more operation modalities and one or more associated parameters.

Figure 6:
FIG. 6 is a table illustrating a first example designated meta-operation (DMO), in accordance with examples of the present disclosure.

FIG. 6 is a table 600 illustrating a first example DMO. The first example DMO is shown having one associated operation modality and three associated parameters. The first example DMO is related to the operation modality of "Looking" and is associated with a first parameter having five terms as follows: (x0, y0, x1, y1, t). The first four terms define a bounding box of a gaze point, and the fifth term, t, refers to the time span of the gaze in seconds. The second parameter includes one term, T, which represents the ending time of the gaze. The third parameter includes one term, L, which represents the hazard level of the potential hazard.

FIG. 7 is a table 700 illustrating a second example DMO. The second example DMO is shown having one associated modality operation and three associated parameters. The second example DMO is related to the modality operation of "Braking" and is associated with a first parameter having one term, a, which corresponds to deceleration; a second parameter having one term, v, which corresponds to the current speed; and a third parameter having one term, L, which represents the hazard level of the potential hazard.

FIG. 8 is a table 800 illustrating a third example DMO. The third example DMO is shown having one associated modality operation and three associated parameters. The example DMO is related to the modality operation of "Steering" and is associated with a first parameter having one term, $\Theta$, which corresponds to steering wheel angle; a second parameter having one term, v, which corresponds to the current speed; and a third parameter having one term, L, which represents the hazard level of the potential hazard.

FIG. 9 is a table 900 illustrating a fourth example DMO. The fourth example DMO is shown having one associated modality operation and three associated parameters. The fourth example DMO is related to the operation of "Acceleration" and is associated with a first parameter having one term, a, which corresponds to acceleration rate; a second parameter having one term, v, which corresponds to the current speed; and a third parameter having one term, L, which represents the hazard level of the potential hazard.

Returning to FIG. 5, following the operation 520, the operation 530 is next.

At the operation 530, the vehicle control system 115 (FIG. 1) instantiates the GTOS associated with the potential driving hazard. The vehicle control system 115 (FIG. 1) may instantiate the GTOS via the ADAS 340 (FIG. 3). In other words, the ADAS 340 (FIG. 3) may instantiate the GTOS DMOs of the corresponding GTOS. Instantiating the GTOS may involve populating the parameters of a GTOS DMO with numerical values from the ADAS 340.

For example, referring again to FIG. 6, in some implementations, the "Looking" operation represented by table 600 may be associated with looking at a potential driving hazard, for example, with looking at a red light. In such scenarios, an exterior environment sensing system, such as the ADAS 340 (FIG. 3) may provide real-time numerical values, corresponding to the red light, for each parameter of the "Looking" operation. The real-time numerical values may be determined by the ADAS 340 (FIG. 3) and may be calibrated (e.g., by the driver assistance application 350 (FIG. 3)) to be consistent with the gaze tracking system, e.g., with the gaze trackers.

For example, subsequent to instantiation, a data entry in connection with the table 600 might be:

Look (10, 7, 10, 8, 2.1, 0.5, high);

where "Look" indicates that the modality operation is a "Looking", the terms "10, 7, 10, 8" define a bounding box of a gaze; the term "2.1" describes the time span or age of the gaze; the term "0.5" refers to the ending time of the gaze; and the term "high" describes the hazard level.

As a further example, with reference to FIG. 7, in some implementations, the "Braking" operation may be associated with avoiding a potential driving hazard, e.g., with avoiding an obstacle 40 m down the road. In such an implementation, an external environment sensing system such as the ADAS 340 (FIG. 3) may detect a real-time vehicle speed of 20 m/s. In order to bring the vehicle to a full stop before it reaches the obstacle, the ADAS 340 (FIG. 3) may compute a desired deceleration speed and may populate the "Braking" operation accordingly.

In this way, each GTOS DMO of the corresponding GTOS may be instantiated and may represent a preferred driver behavior under the real-time conditions involving the potential driving hazard.

Returning again to FIG. 5, following the operation 530, the operation 540 is next.

At the operation 540, the vehicle control system 115 (FIG. 1) receives current driver operation parameters representing a current driver operation. The parameters may be received in real time. The parameters may be received from a driver assistance system. The driver assistance system may include one or more of the driver assistance application 350 (FIG. 3), the gaze trackers 120 (FIG. 1) and the CAN-bus network 400 (FIG. 4). The gaze trackers 120 (FIG. 1) may provide data pertaining to the driver's gaze, and the CAN-bus network 400 (FIG. 4) data may provide data pertaining to the driver's steering, acceleration, and braking operations. The data pertaining to the driver's steering, acceleration, and braking operations may be obtained indirectly from steering data and/or acceleration data and/or braking data obtained via the CAN-bus 410 (FIG. 4) from associated ECUs 420-470 (FIG. 4), such as, for example, the steering control unit and/or the engine control unit and/or braking control unit. The steering data, acceleration data, and braking data may be used by the driver assistance application 350 (FIG. 3) to determine, for example, changes in steering wheel position, which pedal a driver's foot is on, and whether the vehicle is accelerating, decelerating, braking, etc. In some embodiments, driver steering, acceleration, and braking parameters may be derived from vehicle bus data, such as CAN-bus 410 (FIG. 4) data.

In addition to, or as an alternative to obtaining driver steering, acceleration, and braking operations data through a CAN-bus network, driver steering, acceleration, and braking parameters may be obtained through an onboard diagnostic (OBD) system.

OBD refers to a vehicle's self-diagnostic and reporting capability. OBD systems may provide the vehicle control system 115 (FIG. 1) and/or the driver assistance application 350 (FIG. 3) access to the status of various vehicle subsystems. Modern OBD implementations use a standardized digital communications port to provide real-time data in addition to a standardized series of diagnostic trouble codes (DTCs), which provide for the identification and remedy of malfunctions within the vehicle.

In some implementations, the vehicle control system 115 (FIG. 1) may receive, for example, gaze parameters corresponding to the driver's gaze. The gaze parameters may be received from the gaze tracking system, e.g., the gaze trackers 120 (FIG. 1), and may be received via the driver assistance application 350 (FIG. 3). The vehicle control system 115 (FIG. 1), via the driver assistance application 350 (FIG. 3), may calibrate the gaze parameters with the ADAS 340 (FIG. 3). The vehicle control system 115 (FIG. 1), via the driver assistance application 350 (FIG. 3), may then use the gaze parameters to determine one or more eye gaze vectors and to compute the intersections of the eye gaze vectors with an ADAS display. In this way, a driver's gaze points and gaze trajectory may be determined.

Following the operation 540, the operation 550 is next.

At the operation 550, the vehicle control system 115 (FIG. 1) maps the current driver operation parameters to a GTOS DMO of the ordered sequence of GTOS DMOS.

In some embodiments, the vehicle control system 115 (FIG. 1) may construct a current driver operation DMO based on the current driver operation parameters. The current driver operation DMO may then be mapped to a GTOS DMO of the ordered sequence of GTOS DMOs.

Referring again to FIG. 6, in some implementations, the "Looking" operation represented by table 600 may be associated with looking at a hazard, e.g., with looking at a red light. The "Looking" operation may be correspond to a current driver operation parameter received by the vehicle control system 115 (FIG. 1). In such scenarios, the gaze trackers 120 (FIG. 2) may provide real-time numerical values for each parameter of the "Looking" operation that correspond to the actual gaze of the driver. In this way, a current driver operation DMO may be constructed and then mapped to an instantiated GTOS DMO of the ordered sequence of GTOS DMOs.

Returning to FIG. 5, following the operation 550, the operation 560 is next.

At the operation 560, the vehicle control system 115 (FIG. 1) receives, from the driver assistance system, subsequent driver operation parameters representing a subsequent driver operation. As described with respect to the current driver operation parameters received at the operation 540, the subsequent driver operation parameters may be received in real time, and may be received from a driver assistance system. The driver assistance system may include one or more of the driver assistance application 350 (FIG. 3), the gaze trackers 120 (FIG. 1) and the CAN-bus network 400 (FIG. 4). The gaze trackers 120 (FIG. 1) may provide data pertaining to the driver's gaze, and the CAN-bus network 400 (FIG. 4) data may provide data pertaining to the driver's steering, acceleration, and braking operations. The data pertaining to the driver's steering, acceleration, and braking operations may be obtained indirectly from steering data and/or acceleration data and/or braking data obtained via the CAN-bus 410 (FIG. 4) from associated ECUs 420-470 (FIG. 4), such as, for example, the steering control unit and/or the engine control unit and/or braking control unit. The steering data, acceleration data, and braking data may be used by the driver assistance application 350 (FIG. 3) to determine, for example, changes in steering wheel position, which pedal a driver's foot is on, and whether the vehicle is accelerating, decelerating, braking, etc. In some embodiments, driver steering, acceleration, and braking operation may be derived from vehicle bus data, such as CAN-bus 410 (FIG. 4) data.

At the operation 570, the vehicle control system 115 (FIG. 1) compares the subsequent driver operation parameters to a set of probable subsequent operations associated with the mapped GTOS DMO. The determination of the set of probable subsequent operations will be discussed with reference to FIG. 13.

At the operation 580, the vehicle control system 115 (FIG. 1) determines that the subsequent driver operation is absent from the set of probable subsequent operations.

At the operation 590, the vehicle control system 115 (FIG. 1) generates an output for alerting the driver to the potential driving hazard. The output may be displayed on the one or more display devices, (e.g., via AR-HUD renderer 320 (FIG. 3)) and may provide, for example, warning symbols overlaid with video. Additionally or alternately, the system may integrate with VUI to warn the driver using appropriate audible language. For example, instead of using a dull buzzer, the VUI may say, "Be aware of the truck on your front-left". In this way, the vehicle control system 115 (FIG. 1) may alert a driver of a potential driving hazard only when it appears that the potential driving hazard has been overlooked.

As described above, a driver may be assisted to be more aware of potential driving hazards and may be encouraged to practice defensive driving to avoid danger. By monitoring driver operation and only alerting the driver when it appears that a potential hazard is being overlooked, safe driving behavior may be encouraged without overwhelming a driver with too much information. This approach also provides a shared autonomy between the driver and autonomous driving features of the vehicle, which may provide a natural transition to fully autonomous driving.

Figure 10:
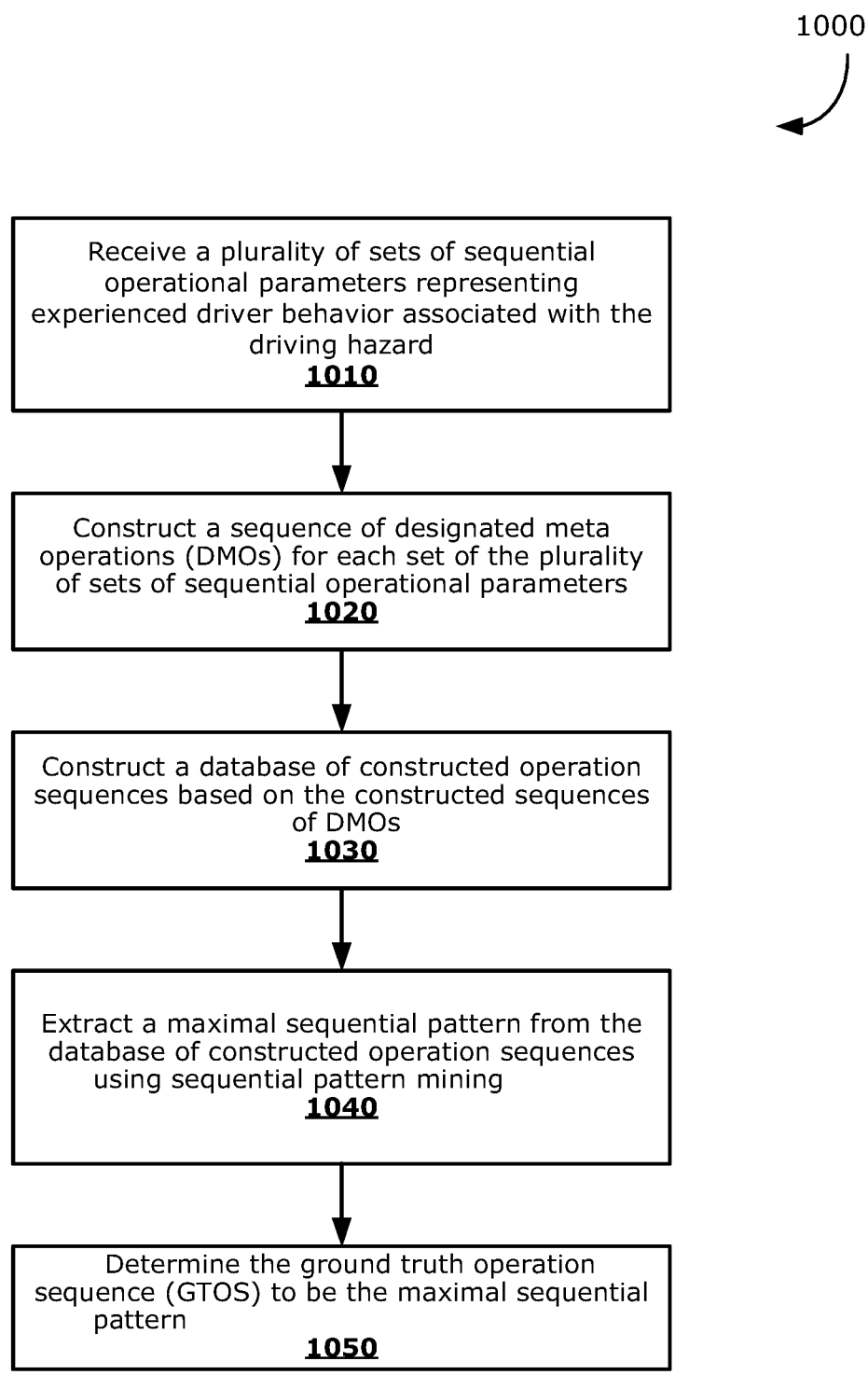
FIG. 10 is a flowchart showing operations performed by the vehicle control system to determine a GTOS corresponding to a potential driving hazard, in accordance with examples of the present disclosure.

FIG. 10 is a flowchart showing operations performed by the vehicle control system to determine a GTOS corresponding to a potential driving hazard, in accordance with examples of the present disclosure.

At the operation 1010, the vehicle control system 115 (FIG. 1) receives a plurality of sets of sequential operational parameters representing experienced driver behavior associated with a potential driving hazard.

There are at least two approaches to determining a GTOS corresponding to a potential driving hazard. For example, in some implementations, a GTOS may be defined through reference to a driver handbook and/or to domain experts (e.g., an experienced human driver). A drawback of this approach is that it can only be used to process a limited number of well-defined tasks. As another example, in some implementations, a second approach may be used. The second approach may be to use sequential pattern mining to extract operation sequences of gaze operations, steering operations, braking operations and acceleration operations from real-life driving data captured from experienced drivers.

The second approach may include recruiting experienced drivers to perform finely sorted tasks (e.g., "Turning Right on a Red Light"). While performing these tasks, sets of sequential operational parameters, including, for example, gaze parameters, steering parameters, braking parameters, and acceleration parameters corresponding to the performance of a plurality of experienced drivers may be received by the vehicle control system 115 (FIG. 1), (e.g., using a gaze tracking system including gaze trackers 120 (FIG. 1) and vehicle bus data such as CAN-bus 410 (FIG. 4) data).

At the operation 1020, the vehicle control system 115 (FIG. 1) constructs a sequence of DMOs for each set of the plurality of sets of sequential operational parameters. The constructed sequences of DMOs may be stored, for example, in the database of driving tasks, which may be stored in the memory 126 (FIG. 2).

Referring again to FIG. 6, in some implementations, the "Looking" operation represented by table 600 may be associated with looking at a hazard, e.g., with looking at a red light. The "Looking" operation may be correspond to an operational parameter of a set of sequential operational parameters received by the vehicle control system 115 (FIG. 1). In such scenarios, the gaze trackers 120 (FIG. 2) may provide real-time numerical values for each parameter of the "Looking" operation that correspond to the actual gaze of the experienced driver. In this way, a sequence of DMOs for each set of the plurality of sets of sequential operational parameters.

Upon completion of the operation 1020, each sequence of DMOs obtained from experienced driver behavior may represent a constructed operation sequence.

At the operation 1030, the vehicle control system 115 (FIG. 1) constructs a database of constructed operation sequences based on the constructed sequences of DMOs, wherein each of the constructed operation sequences corresponds to at least one of the constructed sequences of DMOs (in some examples, a single constructed operation sequence may correspond to multiple constructed sequences of DMOs, for example where there are multiple constructed sequences of DMOs that are the same or similar). The database of constructed operation sequences may be stored, for example, in the database of driving tasks, which may be stored in the memory 126 (FIG. 2).

At the operation 1040, the vehicle control system 115 (FIG. 1) extracts a maximal sequential pattern from the database of constructed operation sequences using sequential pattern mining.

A sequential pattern may be represented as a common subsequence of operations among drivers. A common subsequence of operations satisfies the following criteria: 1) is composed of at least two sets of operations; and 2) happens at least in a number n of drivers, where n is a parameter that can be manually defined. Since a common subsequence of operations may not be complete to perform a task, a maximal sequential pattern may then be mined from sequential patterns. A maximal sequential pattern is a sequential pattern that is not included in other sequential patterns. A maximal sequential pattern may also be considered to be a ground truth operation that represents the collective operation sequence that is commonly performed by experienced drivers.

Figure 11:
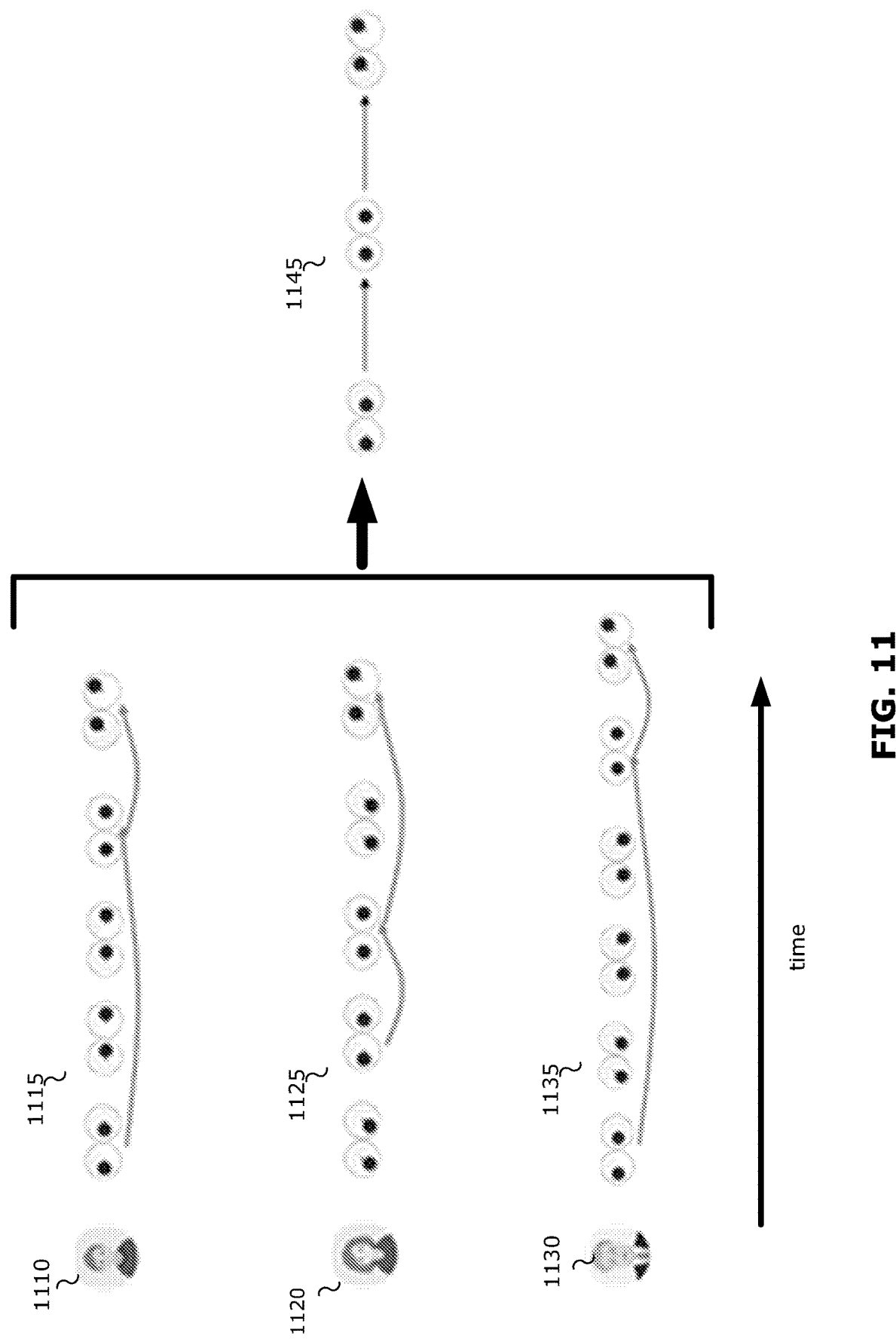
FIG. 11 is a schematic illustration of an example determination of a maximal sequential pattern based on three sample constructed operation sequences, in accordance with examples of the present disclosure.

Reference is now made to FIG. 11, which illustrates an example determination of a maximal sequential pattern (associated with a particular, potential driving hazard), based on three sample constructed operation sequences associated with experienced driver operation. The sample constructed operation sequences may be constructed, for example, from operational parameters received by the vehicle control system 115 (FIG. 1) during the performance of experienced drivers while responding to a potential driving hazard.

The example of FIG. 11 is based on a single modality (i.e., gaze). As shown, Driver One 1110 is associated with a first driver pattern 1115 for the task; Driver Two 1120 is associated with a second driver pattern 1125 for the task; and Driver Three 1130 is associated with a third driver pattern 1135 for the task. It can be observed that each of the driver patterns 1115, 1125, and 1135 of Driver One 1110, Driver Two 1120, and Driver Three 1130, respectively, represent a distinct sequence of operations. However, it can also be observed that among Driver One 1110, Driver Two 1120, and Driver Three 1130, there are three operations that are common in type and in sequence. All three Drivers 1110, 1120, 1130 perform "Look Center" at some point prior to "Look Up and Left", and all three drivers 1110, 1120, 1130 perform "Look Right" at some point prior to "Look Center". As shown, these common operations and their relative order represent the maximal sequential pattern for the associated, potential driving hazard. Accordingly, the maximal sequential pattern for the particular potential driving hazard is illustrated by the fourth pattern 1145.

As shown in FIG. 11, some of the operations of Driver One, Driver Two, and Driver Three do not appear in the resulting maximal sequential pattern. These operations may be described as optional operations in connection with the corresponding GTOS.

In some embodiments, each modality of data may correspond to a different category of operation. In determining the maximal sequential pattern for a potential driving hazard involving multiple modalities of data, e.g., tri-modality data (e.g., gaze, steering, braking), the associated multi-modality DMOs may need to be linearized, i.e., reduced to one dimension. In such cases, each operation set may be represented by a linear encoding. For example, if gaze data has four parameters, steering data has two parameters, and braking data has two parameters, an 8-bit integer may be formed to represent a corresponding operation set (e.g., "gaze, gaze, gaze, gaze, steering, steering, braking, braking"). A single-modality procedure may then be used to identify the associated maximal sequential pattern. It will be noted that there may more than one maximal sequential pattern for each particular, potential driving hazard.

Returning again to FIG. 10, following the operation 1040, the operation 1050 is next.

At the operation 1050, the vehicle control system 115 (FIG. 1) determines the GTOS to be the maximal sequential pattern. In embodiments where there is more than one maximal sequential pattern, there may likewise be more than one corresponding GTOS.

As noted, a GTOS may comprise an ordered sequence of GTOS DMOs. In some embodiments, the GTOS may be defined by a task data structure. In some implementations, the task data structure comprises the GTOS DMOs and a set of rules, the set of rules defining orders of operations among the GTOS DMOs.

Reference is now made to FIG. 12, which is a table 1200 illustrating the data structure of an example task, which may be stored in the database of driving tasks, which may be stored in the memory 126 (FIG. 2). The example task comprises a data structure that may include a sequence of DMOs and rules that define an order of operations. The table 1200 identifies seven example DMOs in connection with the example task of "Turning Right on a Red Light", which are identified by indices E1-E7, respectively. Of the seven example DMOs, E1, E4, and E6 are critical operations, meaning that these operations are essential for the proper execution of the task, as reflected by the associated operation rules.

For illustrative purposes, the table 1200 associates each of the seven DMOs with an icon, such as a steering wheel icon, a braking icon, a looking icon, or an acceleration icon, in order to indicate the category of the particular DMO.

As previously noted, each task comprises a data structure that may include a sequence of DMOs and rules that define the order of operations of the task. As shown, task rules may be defined by two operators: a semicolon operator ";" and an arrow operator "→". A semicolon operator ";" indicates that an event happens any time after another event. For example, "e; f" means that f happens at some time after e. An arrow operator "→" indicates that an event happens immediately after another event. For example, "e→f" means that f happens immediately after e. Each task may have multiple rules, and all rules must be followed for the successful completion of each task.

As shown, rule P1 sets forth that the DMO having index E4 happens at some time later than the DMO having index E1, and that the DMO having index E6 happens at some time later than the DMO having index E4. Rule P2 sets forth that the DMO having index E2 happens immediately after the DMO having index E1, and that the DMO having index E7 happens immediately after the DMO having index E6, and that both the DMO having index E7 and the DMO having index E6 happen at some time after the DMO having index E2.

Sequential rule mining may be used upon the database of constructed operation sequences to extract the confidence that, for a particular task, an operation set Y happens after an operation set X, i.e., P(Y|X), the conditional probability of Y given X. High P(Y|X) indicates that Y is a frequent operation after X. Low P(Y|X) indicates that Y is an infrequent operation after X.

Operation set X may comprise an initial DMO of a GTOS as a sole operation of operation set X. Alternatively, operation set X may comprise the initial DMO of a GTOS and one or more subsequent operations of the GTOS. Operation set Y may include one or more operations, and may represent a subsequent driver operation.

Figure 13:
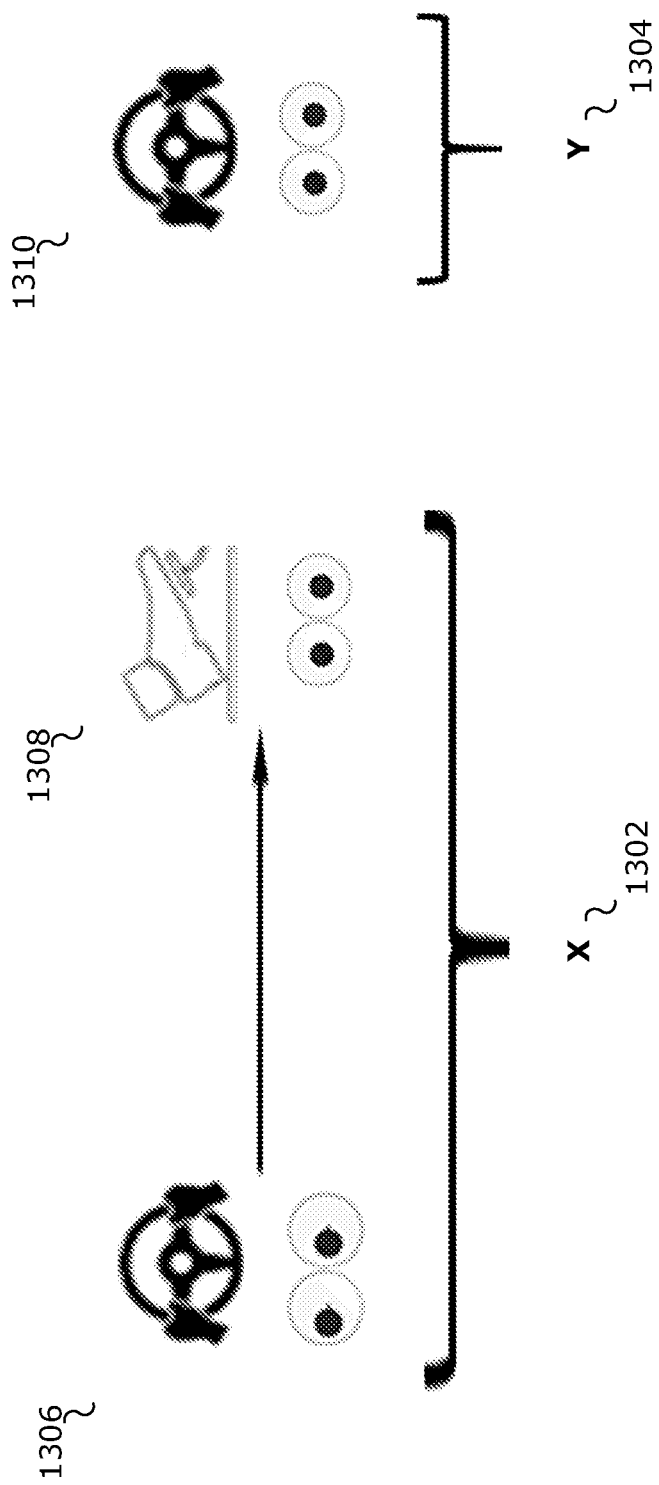
FIG. 13 is an illustration of an example operation set X followed by an example operation set Y, in accordance with examples of the present disclosure.

Reference is now made to FIG. 13, which illustrates an example operation set X 1302 followed by an example operation set Y 1304, in accordance with examples of the present disclosure.

Operation set X 1302 represents an example partial sequence of an example GTOS, beginning with an initial DMO 1306 of the GTOS and concluding with a concluding DMO 1308. In some embodiments, operation set X may include all of the DMOs of the GTOS between the initial DMO 1306 and the concluding DMO 1308. As shown, the initial DMO 1306 is a dual modality DMO and is repre-sented by a steering icon and a "Look Right" icon. As further shown, the concluding DMO 1308 is also a dual modality DMO, as is represented by an acceleration icon and a "Look Center" icon.

Operation set Y 1304 comprises a subsequent DMO 1310 corresponding to a subsequent driver operation. The subsequent driver operation may be an optional operation, as described with reference to FIG. 11. That is, operation set Y 1304 may represent an operation performed by an experienced driver prior to determining the corresponding GTOS. In the example illustrated by FIG. 13, the subsequent DMO 1310 is a dual modality DMO and is represented by a steering icon and a "Look Center" icon.

There are a number of approaches to computing P(Y|X). In some implementations, the following equation may be used:

$$P(Y \mid X) = \frac{sup(X \cup Y)}{sup(X)},$$

where sup( ) denotes how often an operation set appears in the equation.

Additionally or alternatively, a recurrent neural network (e.g., long short-term memory (LSTM) and/or gated recurrent unit (GRU)) may be used to learn the probabilities.

In some embodiments, sequential rule mining, as described above, may be used to construct a set of probable subsequent operations for each GTOS DMO of a GTOS.

For example, sequential rule mining may provide P(Y|X) for various values of X and Y. In some embodiments, each particular GTOS DMO may correspond to an operation set X that begins with the initial DMO of the GTOS and concludes with the particular GTOS DMO. Given a particular operation set X (corresponding to a particular GTOS DMO), each value of Y having a corresponding P(Y|X) that is greater than or equal to a threshold value, (e.g., 50%), may be included in the set of probable subsequent operations for the particular GTOS DMO.

As described above, a driver may be assisted to be more aware of potential driving hazards and may be encouraged to practice defensive driving to avoid danger. By monitoring driver operation and only alerting the driver when it appears that a potential hazard is being overlooked, safe driving behavior may be encouraged without overwhelming a driver with too much information. This approach also provides a shared autonomy between the driver and autonomous driving features of the vehicle, which may provide a natural transition to fully autonomous driving.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A vehicle control system comprising:
one or more processors;
a memory coupled to the one or more processors, the memory storing executable instructions which, when executed by the one or more processors, cause the system to:
receive, from a driver assistance system, current driver operation parameters representing a current driver operation;
receive, from an exterior environment sensing system, hazard parameters representing a potential driving hazard, the potential driving hazard having a corresponding Ground Truth Operation Sequence (GTOS) comprising an ordered sequence of GTOS designated meta operations (DMOs);
wherein the corresponding GTOS is a maximal sequential pattern extracted from a database of constructed operation sequences containing sequences of DMOs constructed from a plurality of sets of sequential operational parameters representing experienced driver behavior associated with the potential driving hazard;
map the current driver operation parameters to a GTOS DMO of the ordered sequence of the GTOS DMOs of the corresponding GTOS;
receive, from the driver assistance system, subsequent driver operation parameters representing a subsequent driver operation;
compare the subsequent driver operation parameters to a set of probable subsequent operations associated with the mapped GTOS DMO;
determine that the subsequent driver operation is absent from the set of probable subsequent operations; and
generate an output for alerting a driver to the potential driving hazard.

2. The system of claim 1, wherein the system is further caused to, prior to mapping the current driver operation parameters to the GTOS DMO of the ordered sequence of the GTOS DMOs of the corresponding GTOS: retrieve the corresponding GTOS; and instantiate the corresponding GTOS using the hazard parameters.

3. The system of claim 2, wherein the GTOS is defined by a task data structure, the task data structure comprising the GTOS DMOs and a set of rules, the set of rules defining orders of operation among the GTOS DMOs.

4. The system of claim 3, wherein each GTOS DMO and each current driver operation DMO includes an operation and one or more operational parameters.

5. The system of claim 1, wherein the system is further caused to, prior to receiving the hazard parameters representing the potential driving hazards:
receive the plurality of sets of sequential operational parameters representing experienced driver behavior associated with the potential driving hazard;
construct the sequences of DMOs based on the plurality of sets of sequential operational parameters;
construct the database of constructed operation sequences based on the sequences of DMOs, wherein each of the constructed operation sequences corresponds to at least one of the constructed sequences of DMOs;
extract the maximal sequential pattern from the database of constructed operation sequences using sequential pattern mining; and
determine the GTOS to be the maximal sequential pattern.

6. The system of claim 5, wherein the plurality of sets of sequential operational parameters are received from the driver assistance system during operation of the vehicle by experienced drivers.

7. The system of claim 5, wherein the sequence of DMOs includes multimodality DMOs, and wherein the system is further caused to:
prior to extracting the maximal sequential pattern from the database of constructed operation sequences, linearize each multimodality DMO.

8. The system of claim 5, wherein the set of probable subsequent operations associated with the mapped GTOS DMO is determined using sequential rule mining on the constructed operation sequences to determine a likely operation following a previous operation.

9. The system of claim 1, wherein the current driver operation parameters and the subsequent driver operation parameters include one or more gaze parameters, steering parameters, braking parameters and acceleration parameters.

10. The system of claim 9, wherein the gaze parameters are received from one or more gaze tracking systems, and wherein the steering parameters, the braking parameters and the acceleration parameters are received from one or more Electronic Control Units (ECUs).

11. A method for alerting a driver to a potential driving hazard, the method comprising:
receiving, from a driver assistance system, current driver operation parameters representing a current driver operation;
receiving, from an exterior environment sensing system, hazard parameters representing a potential driving hazard, the potential driving hazard having a corresponding Ground Truth Operation Sequence (GTOS) comprising an ordered sequence of GTOS designated meta operations (DMOs);
wherein the corresponding GTOS is a maximal sequential pattern extracted from a database of constructed operation sequences containing sequences of DMOs constructed from a plurality of sets of sequential operational parameters representing experienced driver behavior associated with the potential driving hazard;
mapping the current driver operation parameters to one of the GTOS DMOs of the ordered sequence of the GTOS DMOs of the corresponding GTOS;

receiving, from the driver assistance system, subsequent driver operation parameters representing a subsequent driver operation;

comparing the subsequent driver operation parameters to a set of probable subsequent operations associated with the one of the GTOS DMOs;

determining that the subsequent driver operation is absent from the set of probable subsequent operations; and generating an output for alerting a driver to the potential driving hazard.

12. The method of claim 11, further comprising, prior to mapping the current driver operation parameters to the GTOS DMO of the ordered sequence of the GTOS DMOs of the corresponding GTOS: retrieving the corresponding GTOS; and instantiating the corresponding GTOS using the hazard parameters.

13. The method of claim 12, wherein the GTOS is defined by a task data structure, the task data structure comprising the GTOS DMOs and a set of rules, the set of rules defining orders of operation among the GTOS DMOs.

14. The method of claim 12, wherein each GTOS DMO and each current driver operation DMO includes an operation and one or more operational parameters.

15. The method of claim 11, further comprising, prior to receiving the hazard parameters representing the potential driving hazards:

receiving the plurality of sets of sequential operational parameters representing experienced driver behavior associated with the potential driving hazard;

constructing the sequences of DMOs based on the plurality of sets of sequential operational parameters;

constructing the database of constructed operation sequences based on the sequences of DMOs, wherein each of the constructed operation sequences corresponds to at least one sequence of DMOs;

extracting the maximal sequential pattern from the database of constructed operation sequences using sequential pattern mining; and determining the GTOS to be the maximal sequential pattern.

16. The method of claim 15, wherein the plurality of sets of sequential operational parameters are received from the driver assistance system during operation of a vehicle by experienced drivers.

17. The method of claim 15, wherein the sequence of DMOs includes multimodality DMOs, and wherein the method further comprises:

prior to extracting the maximal sequential pattern from the database of constructed operation sequences, linearizing each multimodality DMO.

18. The method of claim 15, wherein the set of probable subsequent operations associated with the mapped GTOS DMO is determined using sequential rule mining on the constructed operation sequences to determine a likely operation following a previous operation.

19. A non-transitory computer readable medium containing instructions which, which executed by one or more processors, cause the one or more processors to:

receive, from a driver assistance system, current driver operation parameters representing a current driver operation;

receive, from an exterior environment sensing system, hazard parameters representing a potential driving hazard, the potential driving hazard having a corresponding Ground Truth Operation Sequence (GTOS) comprising an ordered sequence of GTOS designated meta operations (DMOs);

wherein the corresponding GTOS is a maximal sequential pattern extracted from a database of constructed operation sequences containing sequences of DMOs constructed from a plurality of sets of sequential operational parameters representing experienced driver behavior associated with the potential driving hazard;

map the current driver operation parameters to a GTOS DMO of the ordered sequence of the GTOS DMOs of the corresponding GTOS;

receive, from the driver assistance system, subsequent driver operation parameters representing a subsequent driver operation;

compare the subsequent driver operation parameters to a set of probable subsequent operations associated with the one of the GTOS DMOs;

determine that the subsequent driver operation is absent from the set of probable subsequent operations; and generate an output for alerting a driver to the potential driving hazard.

20. The non-transitory computer readable medium of claim 19, wherein the instructions further cause the one or more processors to, prior to receiving the hazard parameters representing the potential driving hazards:

receive the plurality of sets of sequential operational parameters representing experienced driver behavior associated with the potential driving hazard;

construct the sequences of DMOs based on the plurality of sets of sequential operational parameters;

construct the database of constructed operation sequences based on the sequences of DMOs, wherein each of the constructed operation sequences corresponds to at least one of the constructed sequences of DMOs;

extract the maximal sequential pattern from the database of constructed operation sequences using sequential pattern mining; and determine the GTOS to be the maximal sequential pattern.

* * * * *